(12) United States Patent
Risi (10) Patent No.: US 7,926,524 B2
(45) Date of Patent: Apr. 19, 2011

(54) UTILIZATION OF COLORATION TO IMPROVE THE DETECTION OF "HIT OR MISS" DEFECTS WHEN USING SCANNER EQUIPMENT AND AN AUTOMATED SAW TO REMOVE DEFECTS IN WOOD PIECES

(75) Inventor: Benoit Risi, Cap St-Ignace (CA)

(73) Assignee: Prolam, Societe En Commandite, Cap St-Ignace, Quebec (CA)

( * ) Notice: Subject to any disclaimer, the term of this patent is extended or adjusted under 35 U.S.C. 154(b) by 285 days.

(21) Appl. No.: 11/866,181

(22) Filed: Oct. 2, 2007

(65) Prior Publication Data

US 2008/0236704 A1  Oct. 2, 2008

Related U.S. Application Data

(60) Provisional application No. 60/848,383, filed on Oct. 2, 2006.

(51) Int. Cl.
*B27M 1/00* (2006.01)
(52) U.S. Cl. .................. 144/364; 144/380; 144/3.1
(58) Field of Classification Search .......... 144/364, 144/380, 2.1, 3.1, 1.1; 427/4, 8, 421.1
See application file for complete search history.

(56) References Cited

U.S. PATENT DOCUMENTS

| | | |
|---|---|---|
| 1,487,255 A | 3/1924 | Magelssen |
| 2,537,343 A | 1/1951 | Golick et al. |
| 2,588,580 A | 3/1952 | Schruggs |
| 3,037,900 A | 6/1962 | Hings et al. |
| 3,262,723 A | 7/1966 | Strickler |
| 3,315,380 A | 4/1967 | Mack, III et al. |
| 3,563,403 A | 2/1971 | Luisada et al. |
| 3,565,741 A | 2/1971 | Jaray |
| 3,681,883 A | 8/1972 | Ehrlich |
| 3,751,864 A | 8/1973 | Berger et al. |
| 3,780,777 A * | 12/1973 | Davies .................. 144/392 |
| 3,848,284 A | 11/1974 | Livingston |
| 3,852,930 A | 12/1974 | Naaman |
| 3,857,217 A | 12/1974 | Reps |
| 3,927,705 A | 12/1975 | Cromeens et al. |
| 3,941,904 A | 3/1976 | Hoh et al. |

(Continued)

FOREIGN PATENT DOCUMENTS

CA   2 224 213   12/1996

(Continued)

OTHER PUBLICATIONS

U.S. Appl. No. 60/500,195, Padmanabhan

*Primary Examiner* — Shelley Self
(74) *Attorney, Agent, or Firm* — Merchant & Gould P.C.

(57) ABSTRACT

In a wood processing plant, planks are typically split into strips and then passed through an automated cross-cutting saw station to remove defects such as knots, cracks or flash. One defect which also occurs is the hit and miss defect caused by a planer and/or a sander. In order to improve the performance of the cross-cutting saw station, color is applied to the wood prior to being planed and sanded. The cross-cutting saw station is then modified to optically inspect the wood for the presence of color, indicating a hit and miss defect, and to remove the portions of the wood containing color.

15 Claims, 10 Drawing Sheets

U.S. PATENT DOCUMENTS

| | | | |
|---|---|---|---|
| 3,942,021 A * | 3/1976 | Barr et al. | 250/559.44 |
| 3,974,303 A | 8/1976 | Iwase et al. | |
| 4,016,232 A | 4/1977 | Pringle | |
| 4,019,301 A | 4/1977 | Fox | |
| 4,020,123 A | 4/1977 | Trapasso | |
| 4,081,148 A | 3/1978 | Murphy | |
| 4,083,743 A | 4/1978 | Degens | |
| 4,095,634 A | 6/1978 | Berglund et al. | |
| 4,121,855 A | 10/1978 | Mortenson | |
| 4,128,119 A | 12/1978 | Maier | |
| 4,146,672 A | 3/1979 | Jasperson | |
| 4,158,712 A | 6/1979 | Degens | |
| 4,158,713 A | 6/1979 | Degens | |
| 4,158,778 A * | 6/1979 | Gard et al. | 250/461.1 |
| 4,180,413 A | 12/1979 | Diederich | |
| 4,188,445 A | 2/1980 | Hill | |
| 4,190,686 A | 2/1980 | Muis | |
| 4,220,115 A * | 9/1980 | Brossman et al. | 118/684 |
| 4,234,648 A | 11/1980 | Patz et al. | |
| 4,265,981 A | 5/1981 | Campbell | |
| 4,288,957 A | 9/1981 | Meehan | |
| 4,294,647 A | 10/1981 | Strickler | |
| 4,295,910 A | 10/1981 | Cooley et al. | |
| 4,307,883 A | 12/1981 | Kelly | |
| 4,316,925 A | 2/1982 | Delmonte | |
| 4,323,615 A | 4/1982 | Sauder | |
| 4,364,993 A | 12/1982 | Edelman et al. | |
| 4,378,402 A | 3/1983 | Below | |
| 4,443,520 A | 4/1984 | Braithwaite, Jr. | |
| 4,489,121 A | 12/1984 | Luckanuck | |
| 4,496,613 A | 1/1985 | Zagefka et al. | |
| 4,500,387 A | 2/1985 | Embury | |
| 4,520,057 A | 5/1985 | Fujii et al. | |
| 4,526,418 A | 7/1985 | Martin | |
| 4,528,231 A | 7/1985 | Lund | |
| 4,543,765 A | 10/1985 | Barrett | |
| 4,614,555 A * | 9/1986 | Smith et al. | 156/64 |
| 4,620,892 A | 11/1986 | Dodson et al. | |
| 4,624,295 A | 11/1986 | Howland | |
| 4,674,745 A | 6/1987 | Speranza | |
| 4,683,689 A | 8/1987 | Loggy | |
| 4,706,424 A | 11/1987 | Garapick et al. | |
| 4,731,140 A | 3/1988 | Yontrarak | |
| 4,735,851 A | 4/1988 | Dodson et al. | |
| 4,801,483 A | 1/1989 | Beckerman et al. | |
| 4,857,578 A | 8/1989 | Hall | |
| 4,880,584 A | 11/1989 | Jones et al. | |
| 4,897,286 A | 1/1990 | Kosuda et al. | |
| 4,904,328 A | 2/1990 | Beecher et al. | |
| 4,913,485 A | 4/1990 | Moffatt et al. | |
| 4,931,113 A | 6/1990 | Feichtmeir et al. | |
| 4,938,265 A | 7/1990 | Mountz | |
| 4,957,801 A | 9/1990 | Maranci et al. | |
| 5,026,600 A | 6/1991 | Akao | |
| 5,041,322 A | 8/1991 | Fouquet | |
| 5,054,843 A | 10/1991 | Gray | |
| 5,055,156 A | 10/1991 | Marino et al. | |
| 5,059,472 A | 10/1991 | Le Bell et al. | |
| 5,106,446 A | 4/1992 | Beck et al. | |
| 5,117,603 A | 6/1992 | Weintraub | |
| 5,135,598 A | 8/1992 | Kobe et al. | |
| 5,135,793 A | 8/1992 | Socha | |
| 5,143,418 A | 9/1992 | Fouquet | |
| 5,153,058 A | 10/1992 | Hall et al. | |
| 5,162,407 A | 11/1992 | Turner | |
| 5,166,302 A | 11/1992 | Werner et al. | |
| 5,187,000 A | 2/1993 | Chow et al. | |
| 5,190,607 A | 3/1993 | Werner et al. | |
| 5,198,481 A | 3/1993 | Cope | |
| 5,207,172 A | 5/1993 | Wolter | |
| 5,209,983 A | 5/1993 | Case et al. | |
| 5,236,754 A | 8/1993 | McBride et al. | |
| 5,273,787 A | 12/1993 | Gnatowski | |
| 5,277,479 A | 1/1994 | Koyama et al. | |
| 5,316,834 A | 5/1994 | Matsuda et al. | |
| 5,336,304 A | 8/1994 | Andoe | |
| 5,362,545 A | 11/1994 | Tingley | |
| 5,380,131 A | 1/1995 | Crawford | |
| 5,407,517 A | 4/1995 | Hänsel et al. | |
| 5,498,460 A | 3/1996 | Tingley | |
| 5,501,054 A | 3/1996 | Soltis et al. | |
| 5,509,715 A | 4/1996 | Scharpf | |
| 5,519,094 A | 5/1996 | Tseng et al. | |
| 5,597,024 A * | 1/1997 | Bolyard et al. | 144/369 |
| 5,599,895 A | 2/1997 | Heider | |
| 5,603,798 A | 2/1997 | Bhat | |
| 5,633,074 A | 5/1997 | Muroi et al. | |
| 5,639,807 A | 6/1997 | Secrist et al. | |
| 5,648,137 A | 7/1997 | Blackmore | |
| 5,679,191 A | 10/1997 | Robinson | |
| 5,695,884 A | 12/1997 | Ishimaru et al. | |
| 5,710,215 A | 1/1998 | Abend | |
| 5,719,239 A | 2/1998 | Mirous et al. | |
| 5,730,485 A | 3/1998 | Sjostedt et al. | |
| 5,750,616 A | 5/1998 | Shimpuku et al. | |
| 5,776,406 A | 7/1998 | Schubert et al. | |
| 5,788,908 A | 8/1998 | Murakami | |
| 5,824,373 A | 10/1998 | Biller et al. | |
| 5,827,393 A | 10/1998 | Kinzelmann et al. | |
| 5,866,656 A | 2/1999 | Hung et al. | |
| 5,928,735 A | 7/1999 | Padmanabhan et al. | |
| 5,930,967 A | 8/1999 | Stoehr et al. | |
| 5,960,104 A * | 9/1999 | Conners et al. | 382/141 |
| 5,968,630 A | 10/1999 | Foster | |
| 5,985,397 A | 11/1999 | Witt et al. | |
| 6,025,053 A | 2/2000 | Grenier | |
| 6,037,049 A | 3/2000 | Tingley | |
| 6,042,765 A | 3/2000 | Sugahara et al. | |
| 6,043,313 A | 3/2000 | Brink et al. | |
| 6,060,163 A | 5/2000 | Naaman | |
| 6,077,610 A | 6/2000 | Correll et al. | |
| 6,082,421 A | 7/2000 | Nicol et al. | |
| 6,089,297 A | 7/2000 | Shibagaki et al. | |
| 6,093,359 A | 7/2000 | Gauchel et al. | |
| 6,103,155 A | 8/2000 | Uchida et al. | |
| 6,106,944 A | 8/2000 | Heikkila et al. | |
| 6,123,882 A | 9/2000 | Uchida et al. | |
| 6,124,393 A | 9/2000 | Haraguchi et al. | |
| 6,135,531 A | 10/2000 | Allen et al. | |
| 6,179,942 B1 | 1/2001 | Padmanabhan | |
| 6,183,824 B1 | 2/2001 | Padmanabhan et al. | |
| 6,189,682 B1 | 2/2001 | Hill | |
| 6,277,771 B1 | 8/2001 | Nishimura et al. | |
| 6,318,794 B1 | 11/2001 | Bérubé | |
| 6,558,765 B2 | 5/2003 | Padmanabhan | |
| 6,558,766 B2 | 5/2003 | Padmanabhan et al. | |
| 6,601,357 B2 | 8/2003 | Tunis | |
| 6,811,877 B2 | 11/2004 | Haislet et al. | |
| 6,843,877 B2 | 1/2005 | Risi | |
| 6,957,675 B2 | 10/2005 | Risi | |
| 7,144,625 B2 | 12/2006 | Tunis | |
| 2005/0266200 A1 | 12/2005 | Padmanabhan | |
| 2006/0101754 A1 | 5/2006 | Risi | |
| 2006/0179733 A1 | 8/2006 | Padmanabhan | |
| 2008/0099105 A1 * | 5/2008 | Kelly | 144/371 |

FOREIGN PATENT DOCUMENTS

| | | |
|---|---|---|
| CA | 2 314 306 | 1/2001 |
| CA | 2 526 767 | 12/2006 |
| DE | 198 35 075 A1 | 2/2000 |
| FR | 1473849 | 3/1967 |
| JP | 6-280375 | 10/1994 |
| JP | 2001-123579 | 5/2001 |
| WO | WO 01/74552 A1 | 10/2001 |

* cited by examiner

FIG. 1a : Rough board without colorant before sanding process

FIG. 1b : Rough board without colorant before sanding process

FIG. 2a : Board without colorant after sanding process

FIG. 2b : Board without colorant after sanding process

FIG. 3a : Rough board with colorant on it before sanding process

FIG. 3b : Rough board with colorant on it before sanding process

FIG. 4a : Board with colorant after sanding process

FIG. 4b : Board with colorant after sanding process

FIG. 5a : Stick with a knot defect

FIG. 5b : Stick with a knot defect

FIG. 5c : Stick with a knot defect

FIG. 6a : Stick with a crack defect

FIG. 6b : Stick with a crack defect

FIG. 7a : Stick with flash defect

FIG. 7b : Stick with flash defect

FIG. 8a : Stick with hit-or-miss defect colored blue

FIG. 8b : Stick with hit-or-miss defect colored blue

FIG. 9 : Stick without defect

UTILIZATION OF COLORATION TO IMPROVE THE DETECTION OF "HIT OR MISS" DEFECTS WHEN USING SCANNER EQUIPMENT AND AN AUTOMATED SAW TO REMOVE DEFECTS IN WOOD PIECES

FIELD OF THE INVENTION

The manufacturing process of the present invention teaches how to use a coloration system to highlight areas where the sand belt or knives of a planer did not hit the wood properly. The remaining coloured area will be detected more efficiently by a color camera used in the scanner equipment used in the wood industry to detect all kinds of wood defects.

BACKGROUND OF THE INVENTION

General Description of the Manufacturing Process of Laminated Hardwood Floors

Currently, high-strength hardwood floors are manufactured by cutting hardwood planks into small strips and subsequently reassembling the strips into 12 in. wide 50 ft. truck floor planks. Before being ripped into small strips, the hardwood plank needs to be sanded or planed on both its top and bottom surfaces. Usually, a rough 4/4 dried hardwood plank has a thickness of between 1 inch to 1.125 inch. During the sanding or planing process, the thickness of the board is reduced and will reach generally between 0.80 and 0.96 inches. It should be noted however that the surface preparation can be done before the hardwood plank is ripped or after. This process is necessary because it prepares the surface of the wood where the glue will be applied. Indeed, the width of the small strip will become the thickness of the laminated floor. The top and the bottom of the plank are the parts where glue will be applied. The surfaces need to be smooth and even on both sides with little tolerance (5 or 7 mils) between both surfaces. The preparation of the wood surfaces is very important. Improperly prepared wood surfaces will create problems during the gluing process or undesirable defects on the final product.

The next phase of manufacture is to remove the defects in the sticks. Some defects such as knots, crack, flash, bark, etc., are the result of variations in the raw wood supply and are removed for both structural and cosmetic reasons. Other defects can be the result of lack of processing during the preparation of the wood surfaces. During the wood surface preparation, for some reason, some surface areas of the sticks have not been hit properly by the sandpaper of the sanding machine or knives of the planer. Those areas are called "hit or miss defects", which means that the sticks do not have the adequate surface preparation to receive the glue. Those areas have to be removed as a defect or the sticks themselves having that defect are removed and must be re-sanded or re-planed in smaller dimensions before being used further in the process into a special batch using narrower sticks.

Once the strips are cleaned of their defects, glue is applied on the appropriate surfaces and then they are glued together using an appropriate adhesive that is cured in a high frequency press. After the assembled plank exits the high frequency press, it is planed to final thickness. At this phase in the manufacturing operation, cosmetic defects are repaired and the boards are prepped for painting.

The prepared boards are then sent through an automated painting line where they are coated with approximately 3 to 4 mils of water-based paint.

Method to Remove Defects on the Sticks

Presently, in North American manufactured laminated floors, the defects in the wood sticks are removed manually by a highly skilled and trained person. With a cross cutter saw operated manually, the skilled person cuts the wood on each side of the defects to remove the defects from the sticks.

But there is a possibility that the defects can be also removed automatically by using new technology which uses a scanner and an automated cross cutting saw. The scanner detects (with sensors such as a camera, X-ray, micro wave, ultrasound, infrared laser, etc.) the defects on the sticks. The computer to which the scanner is operatively connected sends the information (location of the defect on the sticks) to an automated cross cutting saw which is adapted to remove the defects previously detected by the scanner.

The scanner can use different methods to detect hit or miss defects. One of the methods is to detect hit or miss defects by measuring the dimensions of the sticks. This measurement can be done using optical triangulation technology using laser sensors. If the dimension (in that the case the thickness of the stick) is more or less than a predetermined target, the scanner will deduce that there is a hit or miss defect. Another method consists in detecting the hit-or-miss defect with a camera. In this method, the color tone variation between the hit-or-miss defect and the immediate area next to it provides an indication of the defect. This technique will deduce a hit-or-miss defect on the stick when there is a variation of color tone on the wood surface. Finally, the hit-or-miss defect can be also detected by applying, manually, coloured marks on the sticks before the sticks go into the scanner. The sensor (usually a camera) in the scanner will recognize the mark (not the defect itself) and it will be identified as an area where there is a defect to be removed. All these techniques can be used separately or in combination.

These techniques have some problems which limit the efficiency of the detection of the hit or miss defect on the sticks.

When the dimension approach is used, problems occur when the hit-or-miss defects are in the range of the tolerance of the sanding or planning process.

Assuming that the tolerance of the sanding process is around 7 mils, at the exit of the sanding machine the thickness of the sticks will be between 0.916 and 0.93 inches. If the scanner is adjusted to not recognize as a hit or miss defect any variation under 7 mils and that some hit or miss defects are in that range, missed detection will occur (some hit or miss defects will not be detected and will not be removed). On the other hand, if the scanner sensitivity detection is increased above 7 mils, the false detection will occur creating an increase of waste (the scanner will detect hit or miss defects incorrectly).

In the case that the color tone variation method is used to detect hit-or-miss defect, problems occur when color tone variation related to hit-or-miss conflicts with the natural coloration of the wood itself. It is extremely difficult for a camera (black and white) to distinguish between variations of tone of the natural coloration of hardwood and variations of tone due to a hit or miss defect.

In the case when coloured marks are applied manually, the extra labour cost decreases the advantages of using the scanner and cross cutter saw technology. The investment in the automated detection is justified economically by the reduction of the number of people on the production line. If, after making the investment, it takes people to put the coloured marks, the reduction of the labour cost almost disappears. Another problem with the coloured mark is human mistakes which will increase the waste.

For these reasons, the detection of the hit-or-miss defect using these techniques, in the discussed case here, are not accurate, economically inefficient and could create problems: defects which are not removed reduce the quality of the finished product or good wood is identified as defect when it should not be, increasing the waste of the raw material.

Tests have shown that 5% of the sticks at the exit of the automated saw have to be rejected because of the presence of hit or miss defects. At the same time, the improper cuts increase the waste by at least 2%. The false detection of the hit or miss defect can create even more doubt on the economic viability of the use of the scanner in the manufacturing process of hardwood laminated floors or any other manufacturing process in the wood industry where hit or miss defects are important to detect.

SUMMARY OF THE INVENTION

It is an object of the invention to provide a process for identifying hit or miss defects in wood processed by an automated cross-cutting saw station.

Thus, in one aspect the invention provides a process for detecting hit or miss defects in wood, comprising the steps of:
(a) applying color to top and bottom surfaces of wood;
(b) prepping said wood by processing said wood in at least one of a planer, at least one of a sander, or a combination thereof;
(c) ripping a wood plank into wood strips;
(d) processing said strips in a scanning station consisting of a scanner and a cross-cutting saw operatively associated with said scanner, said scanner being adapted to scan said strips for the presence of defects and to control said cross-cutting saw to cut said strips in order to remove portions of said strips containing defects;
wherein said scanner is further adapted to scan said strips of wood for the presence of color on said top and bottom surfaces, and to control the cross-cutting saw to remove portions of said strips which include color.

In another aspect, in a plant for processing wood strips and for removing from said wood strips defects, said plant being of the type comprising:
a ripping station for ripping a wood board into a plurality of wood strips;
a prepping station for processing wood, said prepping station including at least one of a planer, at least one of a sander or a combination thereof;
a scanning station comprising a scanner and a cross-cutting saw operatively connected to said scanner, said scanner being adapted to scan said wood strips for the presence of defects and to control said cross-cutting saw to remove from said strips said defects,
the improvement being characterized in that:
said plant further includes a painting station for applying color to top and bottom surfaces of wood, and in that
said scanner is further adapted to identify portions of said wood strips which contain color and control said cross-cutting saw to remove said portions of said wood strips which contain color.

BRIEF DESCRIPTION OF THE DRAWINGS

The present invention will be better understood after having read a description of a preferred embodiment thereof, made with reference to the following drawings in which.

DESCRIPTION OF A PREFERRED EMBODIMENT OF THE INVENTION

The manufacturing technique provided by the present invention increases the detection efficiency of the hit-or-miss defect without adding labour. The end results are an increase in the quality of the finished product with a reduction of the presence of improper defects in the finished product and a reduction of the waste created by improper detection.

The technique is to use a colorant which is applied, such as by spraying, on all plank surfaces before the sanding or planing process. The remaining coloured spots after the plank is sanded or planed will be detected more easily by the camera used by the scanner.

Several tests have been done in order to select the right combination of colour and camera which gives the best results.

Initially, black was applied to the planks, and a black and white camera was used in the scanner. The results were good but there were still some problems. The natural wood coloration also includes in its range a dark colour which resembles the black coloring used, creating false detection. It thus appeared that the use of a colour which is not naturally present into the natural ranges of colours of the wood would improve results. Red, green, blue and yellow colors have been tested with the utilization of a color camera in the scanner. The results have met expectations and an increase of close to 100% of efficiency of the detection of the hit or miss defect was observed. The use of red, green and blue color with the use of a color camera, to date, gives the best results of detection.

The use of wood coloration technique creates also surprising beneficial side effects. It improves the detection of other defects, such as cracks, knots, flash, etc. Curiously, it also improves the longevity of the sand paper (or the planer knife) by 15% creating savings which easily cover the cost of the colorant. It seems that the humidification of the hardwood plank surface softens the hardwood, making it easier for the sand paper or planer knife to sand or plane the surfaces.

The use of the coloration technique increases the quality of the finished product by reducing the presence of improper defects into the finished product and reduces the raw material lost due to mistakes in the detection of hit or miss defects. The new manufacturing technique using coloration has also insured the economic viability, maximizing the return on investment of the use of scanner and of an automated cross cutter saw. The use of the scanner in the manufacturing process of laminated hardwood floors provides a significant competitive advantage by reducing the cost of labour and increasing the yield of the raw material.

Thus, the process of one aspect of the present invention consists in applying a layer of color to the surface of wood used in the manufacturing of wood planks, particularly for the trailer or container industry.

Figure 10A:
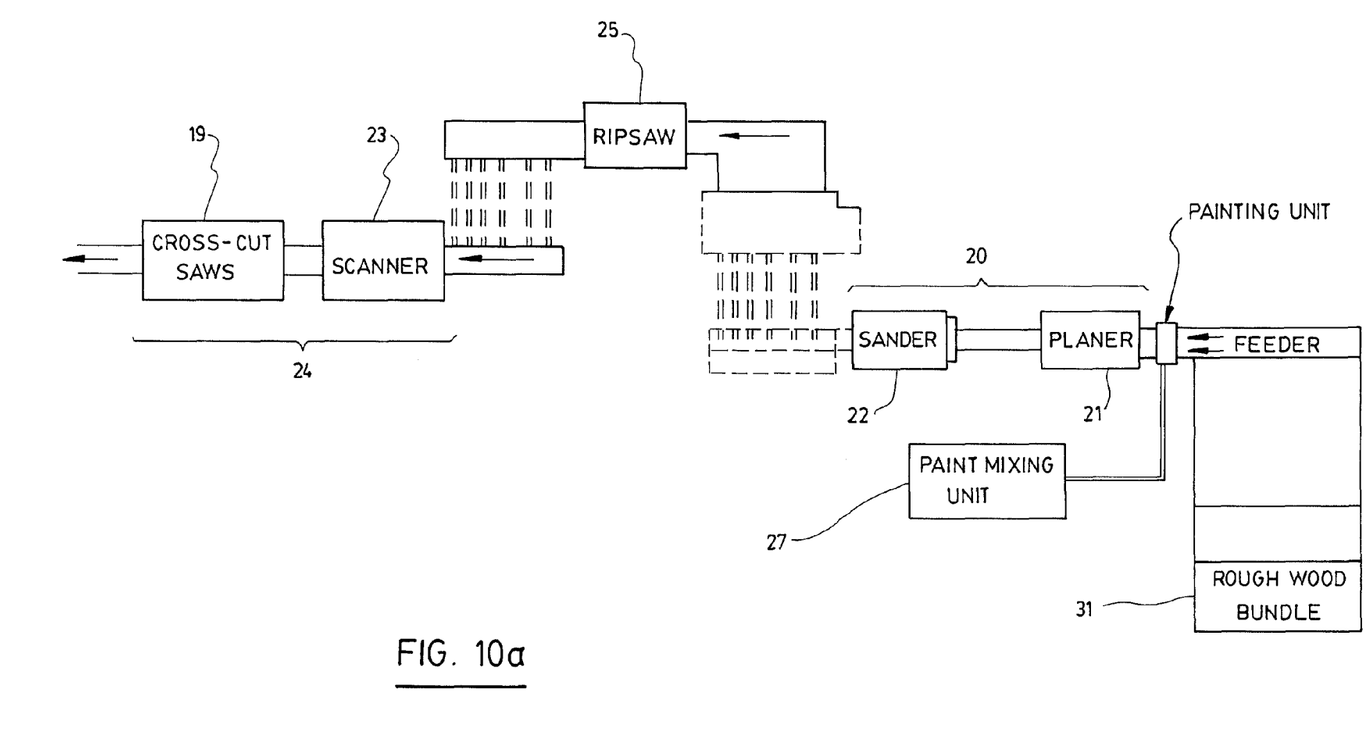
FIGS. 10a, 10b and 10c are schematic representations of a wood processing plant including the improvement of the present invention, where stations are ordered differently.
Figure 10B:
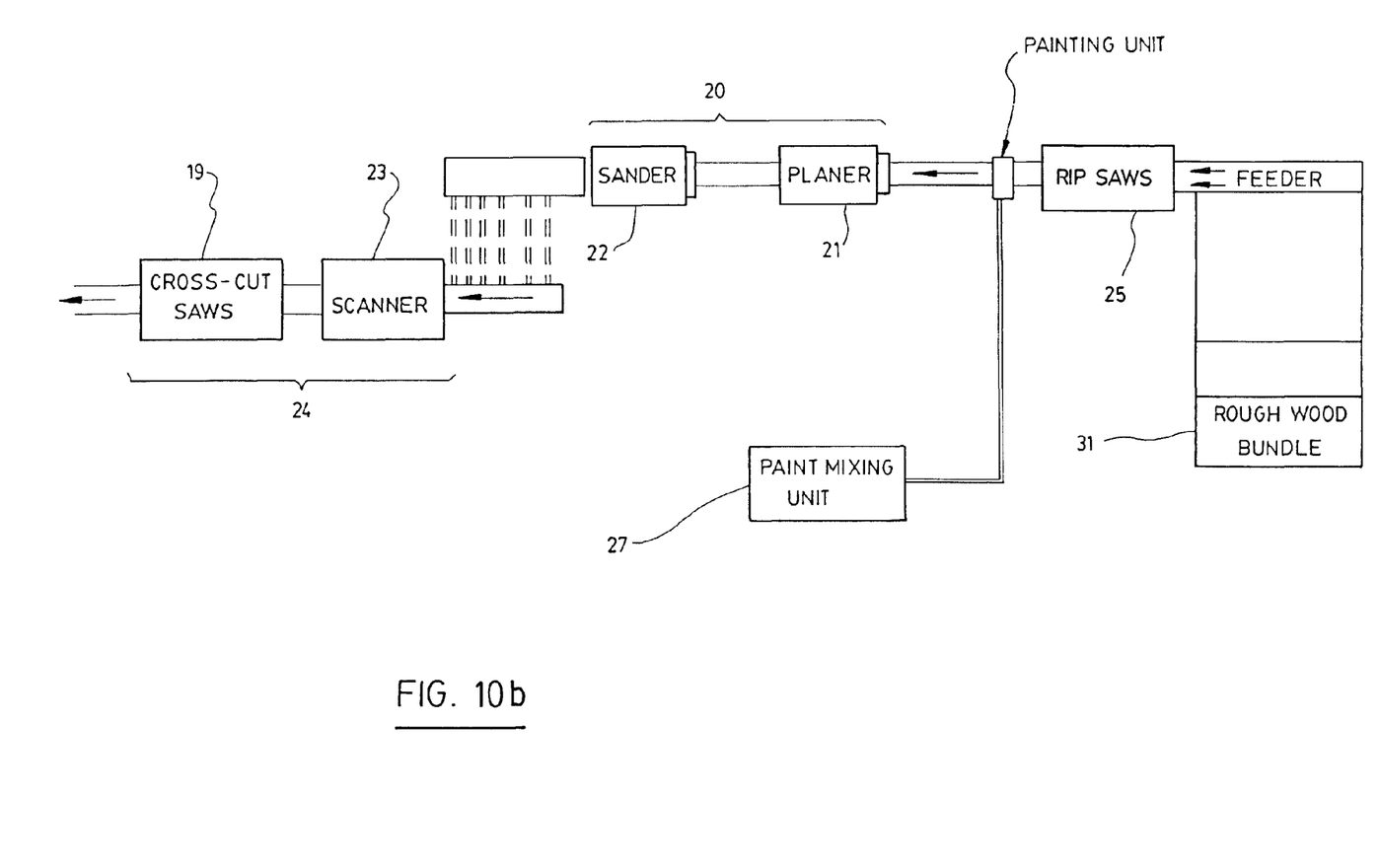
Figure 10C:
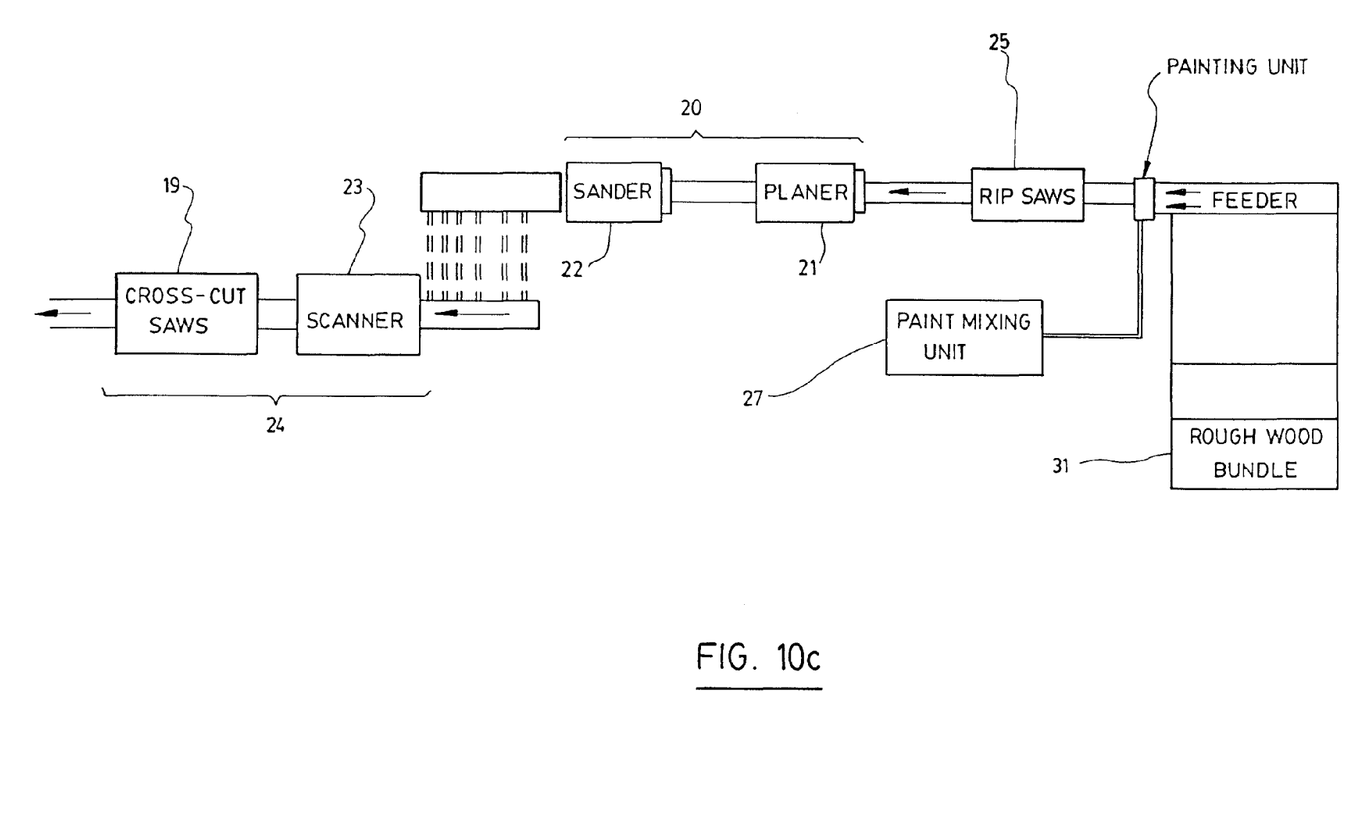

Referring now to FIGS. 10a, 10b and 10c, the invention finds use in plants generally consisting of a ripping station, a prepping station, and a scanning station.

The ripping station 25 is adapted to process a wood board into a plurality of wood strips.

The prepping station 20 consists of at least one of a sander 22, a planer 21, or a combination thereof. Indeed, some older plants only use a sander, or two in cascade, whereas most plants today use a planer followed by a sander. However, the invention also contemplates plants provided only with one or more planers. The prepping station preps the wood (either boards or strips) by preparing the top and bottom surfaces, i.e. essentially smoothing the surfaces to provide a surface which can receive an appropriate adhesive further down the manufacturing line.

The scanning station 24 consists of a scanner 23 and a cross-cutting saw operatively associated with the scanner 23. The scanner is adapted to scan the wood strips for the presence of defects, and to control or instruct the cross-cutting saw to cross-cut the wood strips in order to remove the portions of the wood strips which contain the defects so identified by the scanner. A person skilled in the art will recognize that such scanning stations are well known in the art, and no further details will be provided herein. The reader will also appreciate that literary liberty is taken with the expressions used to describe the scanning station. Indeed, the scanner is an optical device which obtains information as the piece of wood traverses the scanning area. This information is analyzed and processed by a processor, and the result of the processing is used to direct the cross-cutting saw to appropriately cut the piece of wood. In this sense, the scanner "controls" the cross-cutting saw.

FIGS. 10a 10b and 10c show different configurations for such plants, where the order of the different stations described herein differs.

A painting station 27 is further provided for painting the wood (either boards or strips depending on the configuration of the plant).

It is easier to apply color to the boards as opposed to the strips, but a person skilled in the art will recognize that both possibilities are encompassed by the scope of the present invention.

In order to optimize the process according to a preferred embodiment of the invention, the color is preferably red, green or blue (or a combination thereof). What is to be noted is that the color is preferably selected to be a color which is not naturally present in the wood coloring.

Figure 11A:
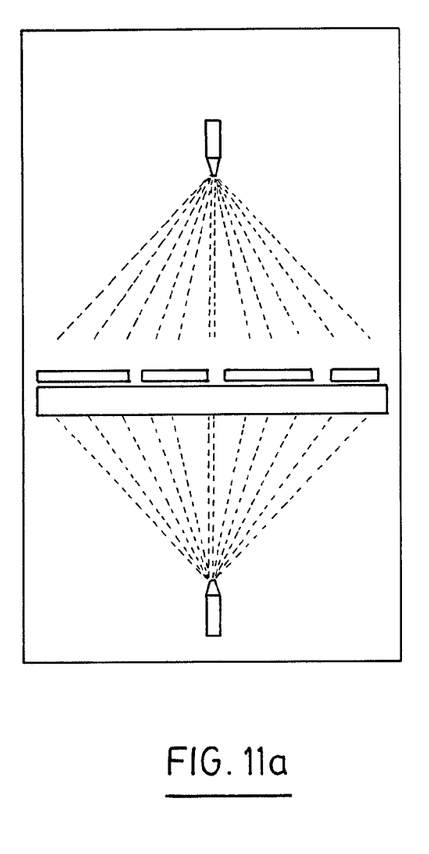
FIG. 11 is a schematic representation of a painting station according to a preferred embodiment of the invention.
Figure 11B:
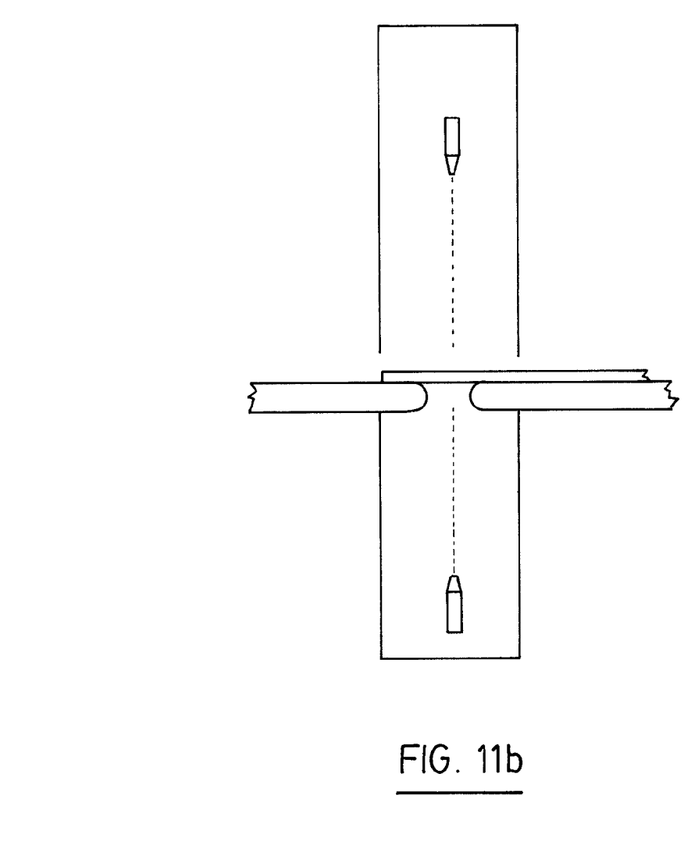

Furthermore, the spraying or painting of the wood in the painting station is adapted to cover the surface of the stick or board with a layer of coloring which is adapted to provided color to the surface, but preferably not penetrate too deeply into the wood (otherwise the depth of color will be greater than the thickness of the wood that is removed by planing and sanding, which would render the process useless). In a preferred embodiment, paint is sprayed in a proportion of approximately 5 mL per square foot. For such a proportion, the colorant used is in the proportion of 1 part colorant for 140 parts water. Of course, the invention does not lie in the specifics of the density of the spraying nor in the dilution of the colorant, which may vary depending on the base colorant used (a thinner colorant will require less water than a thicker colorant). FIG. 11 is a schematic representation of a preferred embodiment for the painting station, where the top and bottom surfaces of the wood are painted simultaneously, in a transverse line. However, other configurations which will meet the objects of the present invention are intended to fall within the scope of the appended claims.

The color camera used in the scanning station is either provided with an optical filter to highlight portions of the stick which still have the color, or the signal received from the camera is processed to focus on a certain wavelength. Preferably, the color cameras (one for the top and one for the bottom) are linear cameras of 900 pixels (but of course the preferred embodiment is not limited thereto). The images captured by the camera are preferably 1 pixel wide by 900 pixels long, and taken at predetermined intervals. In the context of the preferred embodiment described herein, the wood is preferably scanned at intervals of 1.5 mm.

The information obtained from the scanner is further used to control or instruct the cross-cutting saw, so that in addition to the usual defects, portions of the wood stick which still contain color are removed from the wood sticks.

Referring now to FIGS. 1a to 8b, there is illustrated a variety of pieces of wood showing, in sequence, rough boards prior to sanding (1a, 1b), boards without colorant after sanding (2a, 2b), rough boards with colorant prior to sanding (3a, 3b), boards showing hit and miss defects after sanding (4a, 4b), boards or strips with knot defects (5a, 5b, 5c), strips with cracks (6a, 6b), strips with flash (7a, 7b) and strips with hit or miss defects colored blue (8a, 8b).

Figure 1A:
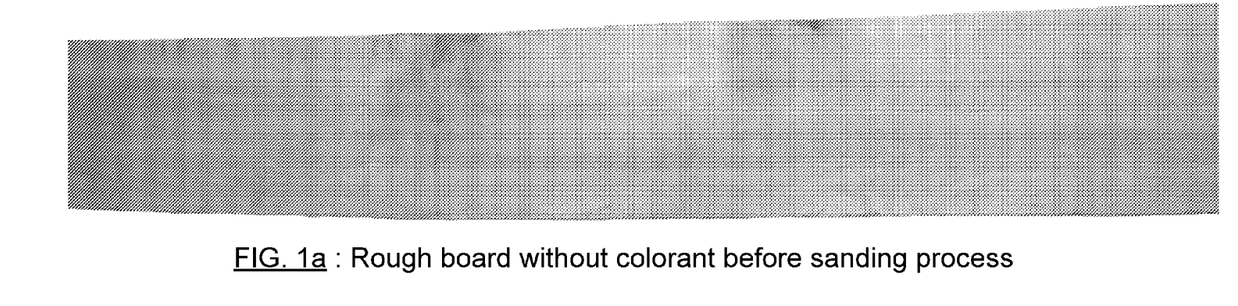
FIGS. 1a and 1b show a rough board without colorant prior to sanding.
Figure 1B:
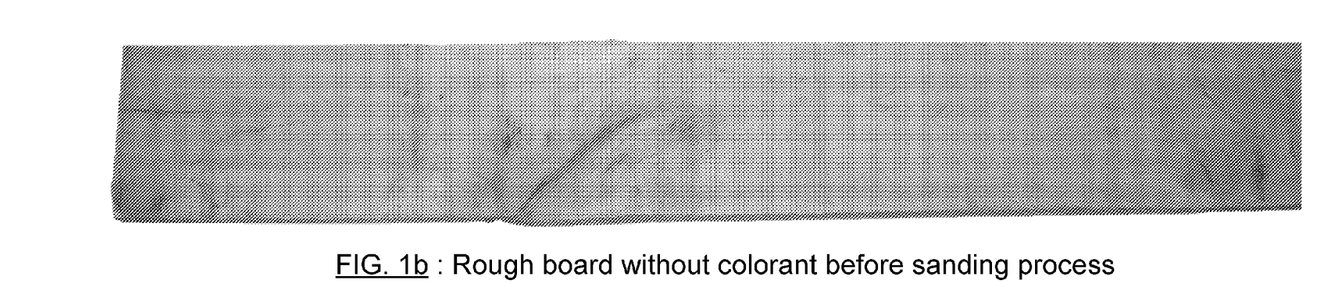
Figure 2A:
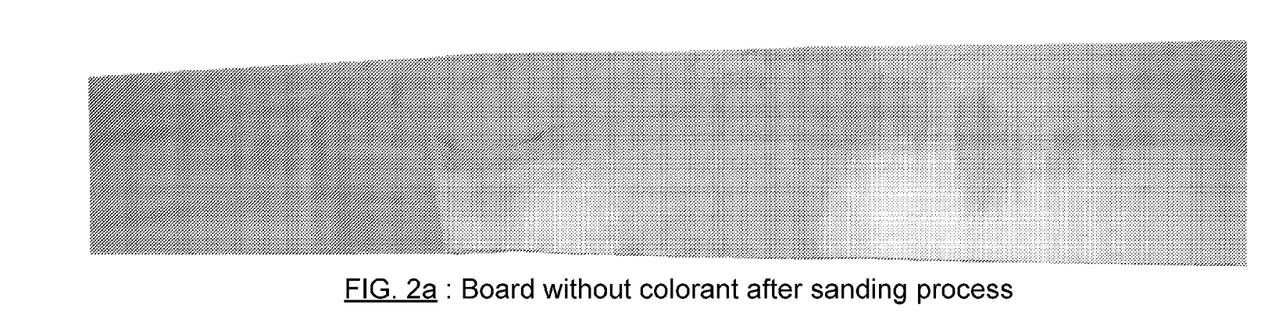
FIGS. 2a and 2b show a board without colorant after sanding.
Figure 2B:
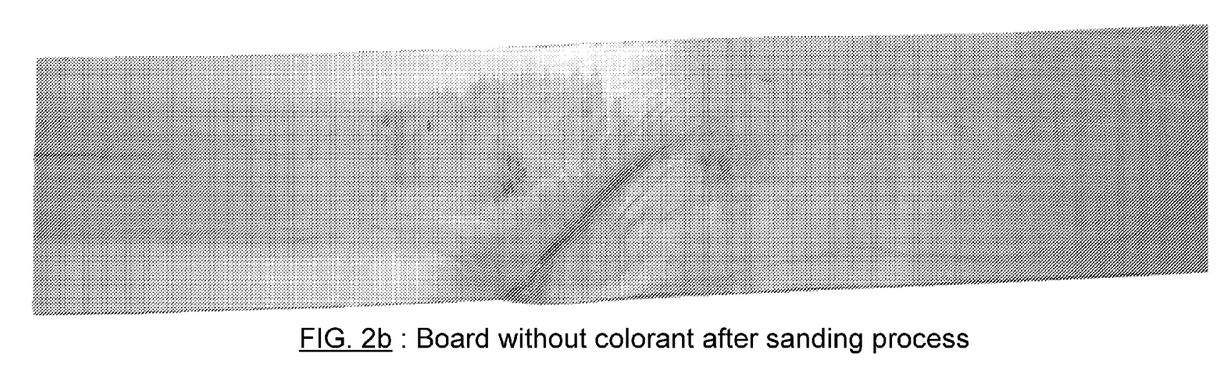
Figure 3A:
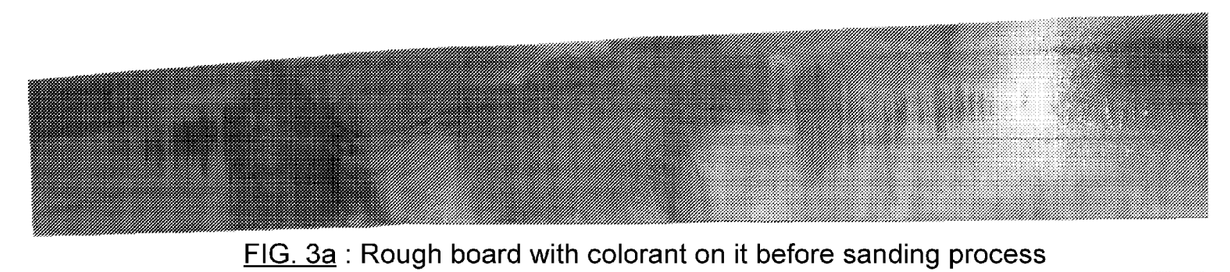
FIGS. 3a and 3b show a rough board with color prior to sanding.
Figure 3B:
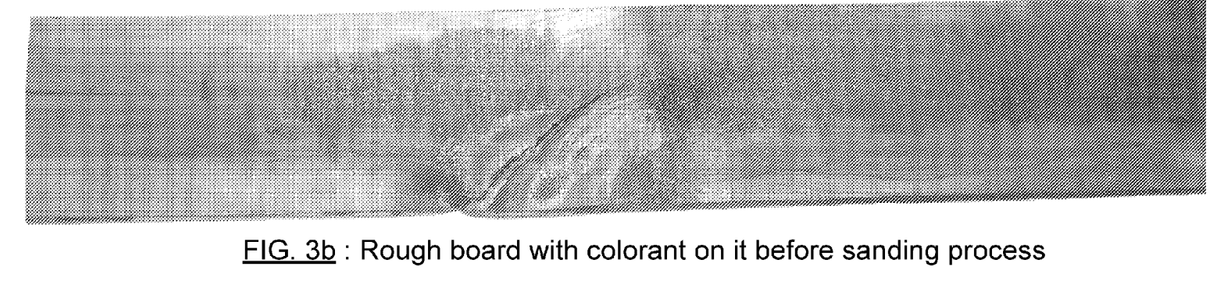
Figure 4A:
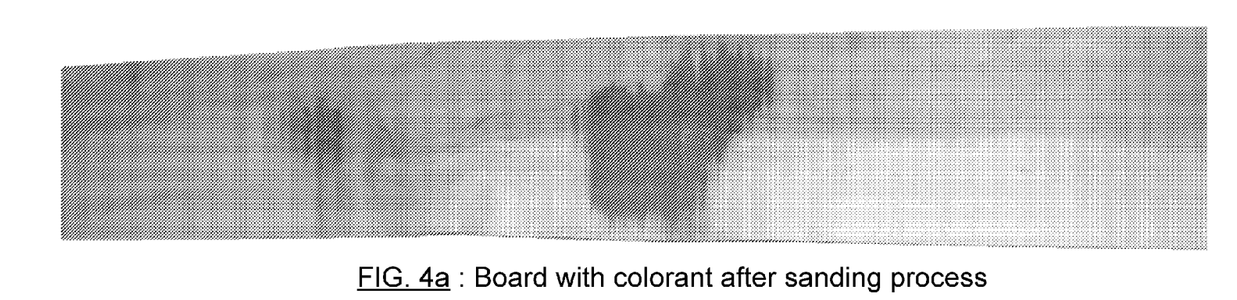
FIGS. 4a and 4b show a board with color after sanding.
Figure 4B:
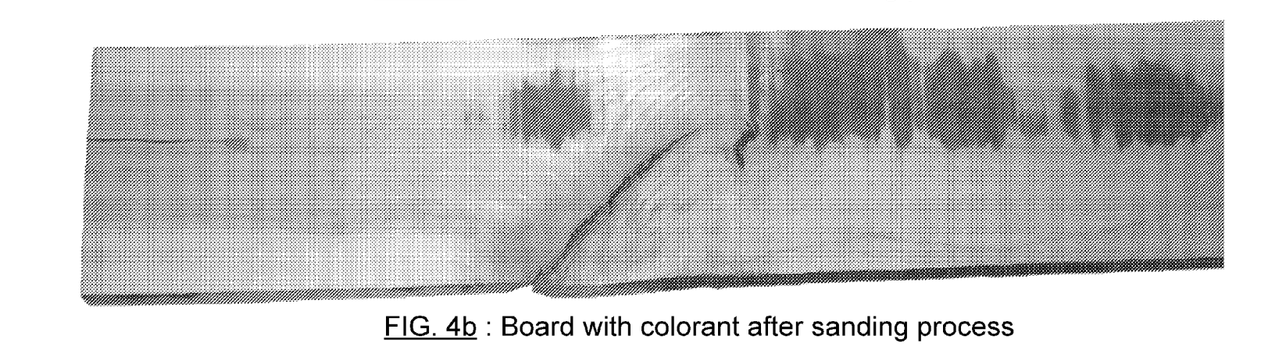
Figure 5A:
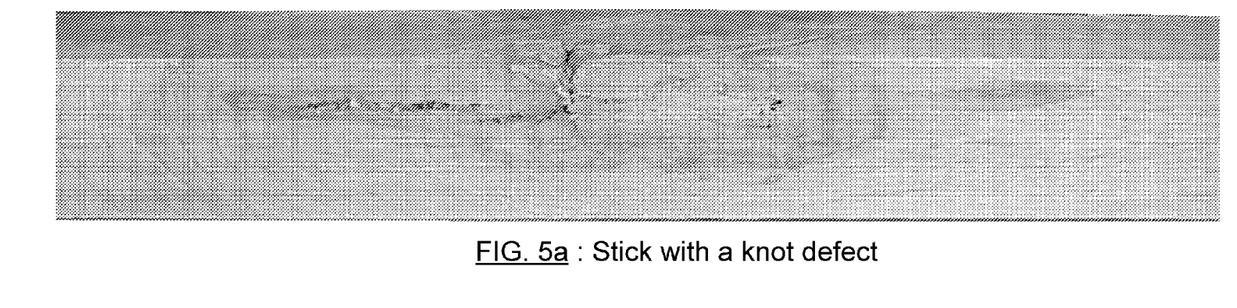
FIGS. 5a, 5b and 5c show a board with a knot.
Figure 5B:
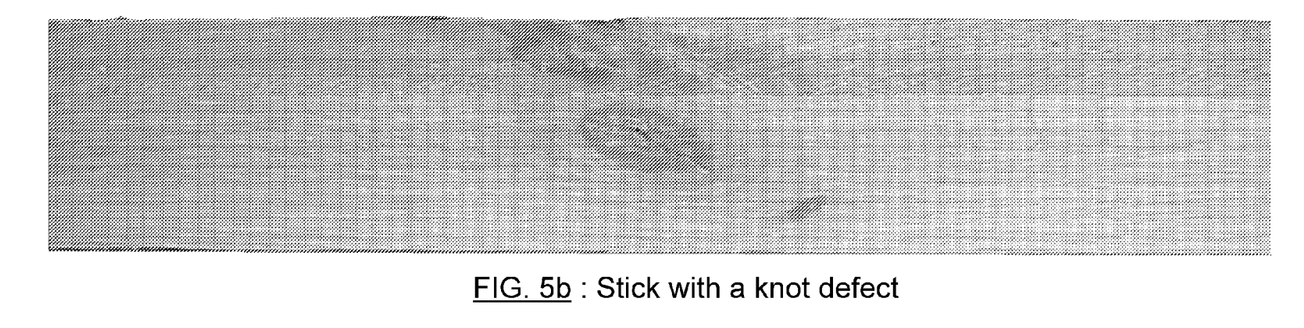
Figure 5C:
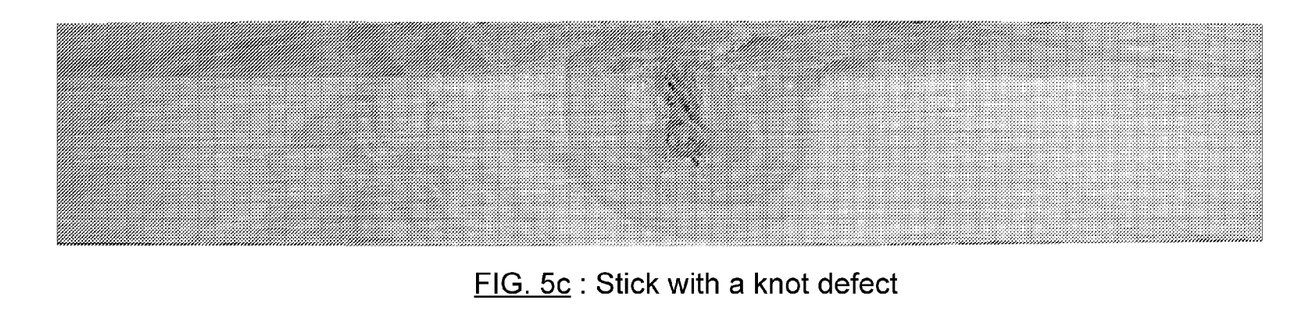
Figure 6A:
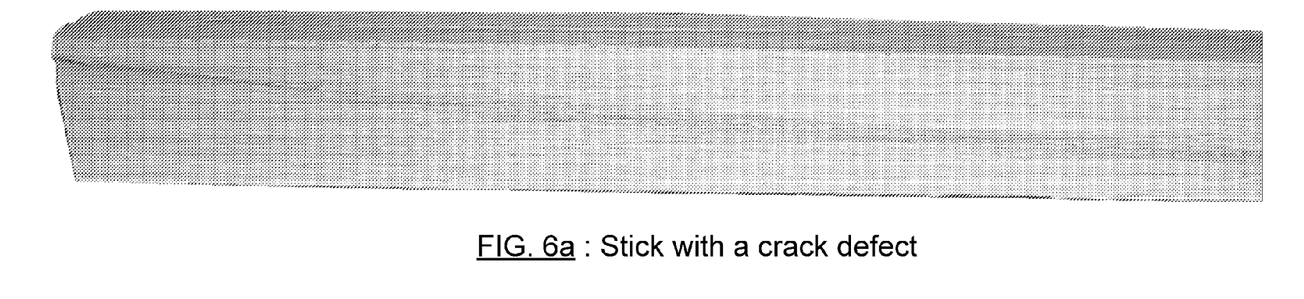
FIGS. 6a and 6b show a board with a crack.
Figure 6B:
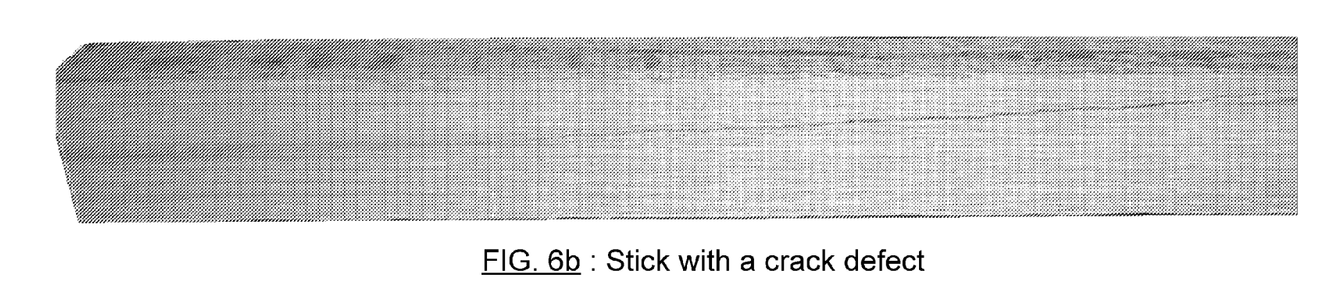
Figure 7A:
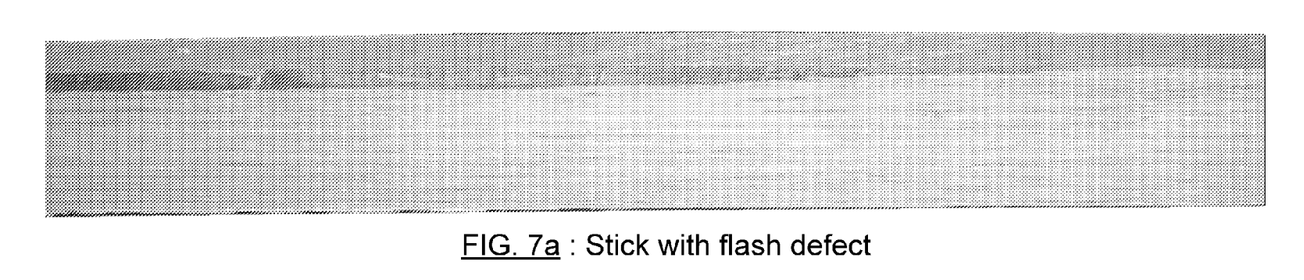
FIGS. 7a and 7b show a board with flash.
Figure 7B:
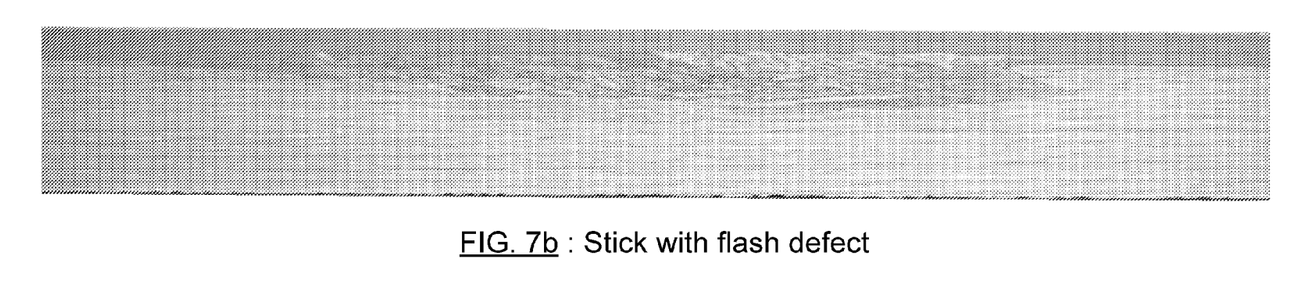
Figure 8A:
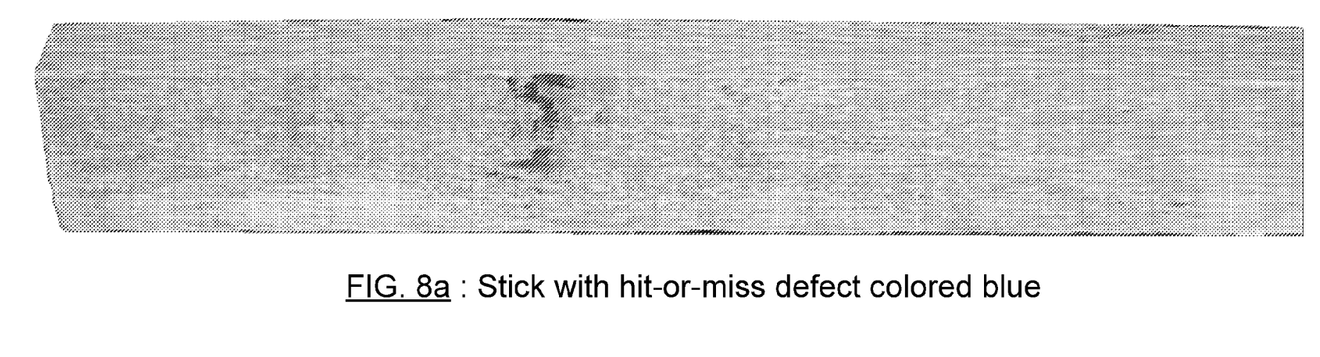
FIGS. 8a and 8b show a board with hit or miss defects colored blue after sanding.
Figure 8B:
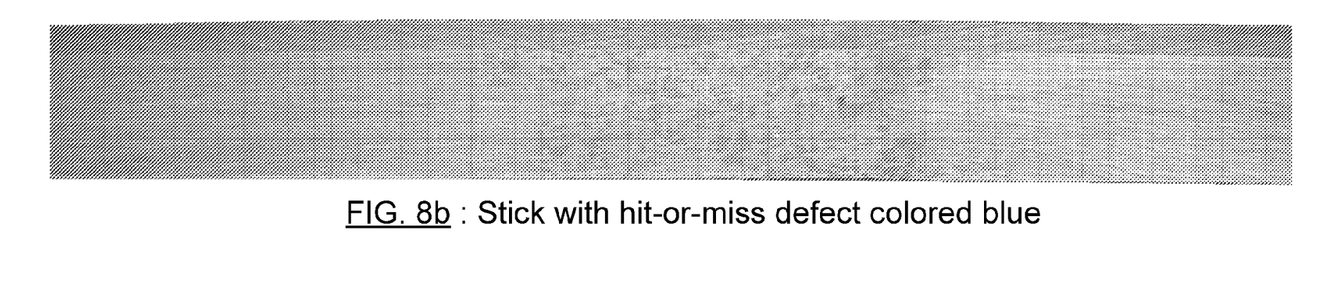
Figure 9:
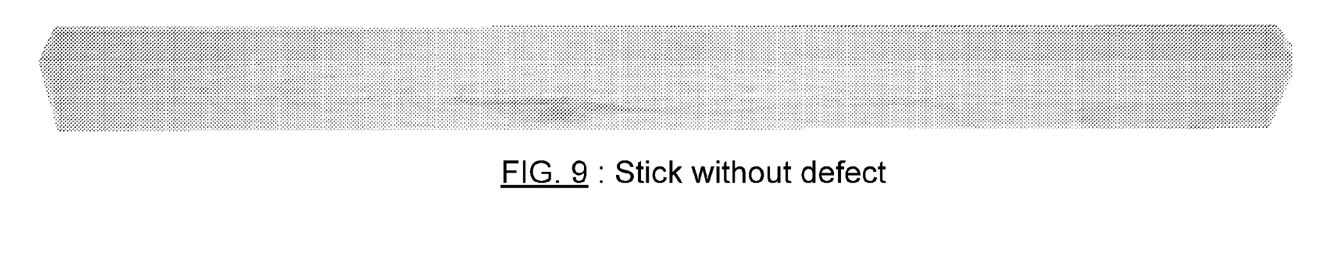
FIG. 9 shows a board with no defects.

FIG. 9 shows a strip with no defects.

The sticks processed according to a preferred embodiment of the invention described herein are substantially free of defects, and the use of coloration decreases the waste material, as well as decreases the number of sticks which still have hit or miss defects.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A process for detecting hit or miss defects in wood, comprising the steps of:
   (a) applying color to a top surface and a bottom surface of said wood;
   (b) after step (a), prepping said wood by processing said top and bottom surfaces of said wood in at least one of a planer or a sander, or a combination thereof;
   (c) ripping said wood into wood strips;
   (d) after steps (b) and (c), processing said strips in a scanning station comprising a scanner and a cross-cutting saw operatively associated with said scanner, said scanner being adapted to scan said strips for the presence of defects and to control said cross-cutting saw to cut said strips in order to remove portions of said strips containing defects; and
   (e) after steps (b) and (c), scanning said strips of wood for the presence of color on said top and bottom surfaces which remains after said prepping, and controlling the cross-cutting saw to remove portions of said strips which include color.

2. A process according to claim 1, wherein said step (c) occurs after said step (a) and before said step (b).

3. A process according to claim 1, wherein said step (c) occurs before said step (a).

4. A process according to claim 1, wherein said step (b) consists in processing said wood in a planer.

5. A process according to claim 1, wherein said step (b) consists in processing said wood in at least one sander.

6. A process according to claim 5, wherein said step (b) consists in processing said wood in two sanders one after the other.

7. A process according to claim 1, wherein said step (b) consists in processing said wood in a planer followed by a sander.

8. A process according to claim 1, wherein said color is selected from the group consisting of red, green and blue.

9. A process according to claim 1, wherein said color is a color that is different from color naturally occurring in said wood.

10. In a plant for processing wood strips and for removing from said wood strips defects, said plant being of the type comprising:
- a ripping station for ripping a wood board into a plurality of wood strips;
- a prepping station for processing a top surface and a bottom surface of either said wood board or said plurality of wood strips, said prepping station including at least one of a planer or a sander or a combination thereof;
- a scanning station comprising a scanner and a cross-cutting saw operatively connected to said scanner, said scanner being adapted to scan said wood strips for the presence of defects and to control said cross-cutting saw to remove from said strips said defects,
- wherein said plant further includes a painting station for applying color to the top surface and the bottom surface of either said wood board or said plurality of wood strips before being processed at the prepping station, and
- wherein said scanner is further adapted to identify portions of said wood strips which contain color remaining after said processing by said prepping station and control said cross-cutting saw to remove said portions of said wood strips which contain color.

11. A plant according to claim 10, wherein said wood plant is arranged so that wood first enters said painting station, followed by said prepping station, followed by said ripping station, followed by said scanning station.

12. A plant according to claim 10, wherein said wood plant is arranged so that wood first enters said ripping station, followed by said painting station, followed by said prepping station, followed by said scanning station.

13. A plant according to claim 10, wherein said wood plant is arranged so that wood first enters said painting station, followed by said ripping station, followed by said prepping station, followed by said scanning station.

14. A plant according to claim 10, wherein said color is a color that is different from color naturally occurring in said piece of wood.

15. A plant according to claim 10, wherein said color is selected from the group consisting of red, green and blue.

* * * * *